US006985633B2

(12) United States Patent
Weiss et al.

(10) Patent No.: US 6,985,633 B2
(45) Date of Patent: Jan. 10, 2006

(54) DEVICE AND METHOD FOR DECODING CLASS-BASED CODEWORDS

(75) Inventors: Shlomo Weiss, Rehovot (IL); Shay Beren, Yehud (IL)

(73) Assignee: Ramot at Tel Aviv University Ltd., Tel Aviv (IL)

(*) Notice: Subject to any disclaimer, the term of this patent is extended or adjusted under 35 U.S.C. 154(b) by 572 days.

(21) Appl. No.: 10/096,924

(22) Filed: Mar. 14, 2002

(65) Prior Publication Data

US 2003/0044074 A1 Mar. 6, 2003

Related U.S. Application Data

(60) Provisional application No. 60/278,868, filed on Mar. 26, 2001.

(51) Int. Cl.
G06K 9/36 (2006.01)
H03M 7/40 (2006.01)

(52) U.S. Cl. ......................... 382/246; 341/65
(58) Field of Classification Search ................ 382/190, 382/232, 233, 246, 247, 253; 341/51, 63, 341/65, 67, 107; 375/240.16, 240.22, 240.25; 714/784, 795
See application file for complete search history.

(56) References Cited

U.S. PATENT DOCUMENTS

| | | | | |
|---|---|---|---|---|
| 3,918,047 A | * | 11/1975 | Denes | 341/67 |
| 3,984,833 A | * | 10/1976 | Van Voorhis | 341/63 |
| 5,444,800 A | * | 8/1995 | Kim | 382/239 |
| 5,583,500 A | * | 12/1996 | Allen et al. | 341/107 |
| 5,632,024 A | | 5/1997 | Yajima et al. | 712/205 |
| 5,652,852 A | | 7/1997 | Yokota | 712/208 |
| 5,668,599 A | * | 9/1997 | Cheney et al. | 375/240.15 |
| 5,717,394 A | * | 2/1998 | Schwartz et al. | 341/51 |
| 5,784,585 A | | 7/1998 | Denman | 712/209 |
| 5,872,599 A | * | 2/1999 | Rosenbrg | 375/240.16 |
| 5,905,893 A | | 5/1999 | Worrell | 717/151 |
| 6,052,415 A | * | 4/2000 | Carr et al. | 375/240.12 |
| 6,307,489 B1 | * | 10/2001 | Freking et al. | 341/65 |
| 6,360,348 B1 | * | 3/2002 | Yang | 714/784 |
| 6,408,421 B1 | * | 6/2002 | Benes et al. | 714/795 |

(Continued)

FOREIGN PATENT DOCUMENTS

US WO 98/38791 9/1998

OTHER PUBLICATIONS

T. A. Welch, "A technique for high-performance data compression", *IEEE Computer* vol. 17, No. 6 pp. 8-19 (Jun. 1984).

(Continued)

*Primary Examiner*—Andrew W. Johns
*Assistant Examiner*—Amir Alavi
(74) *Attorney, Agent, or Firm*—Mark M. Friedman

(57) ABSTRACT

Alphabet-partitioned codewords, for example class based codewords, are decoded using a two-part decoder. The first part is a class code decoder that extracts, from the codeword, information for decoding the symbol code. The second part is a symbol code decoder that uses that information to decode the symbol code. If the symbol code is a literal, the symbol is just stripped from the codeword; otherwise, the symbol is retrieved from a symbol memory. Throughput of blocks of even numbers of codewords is enhanced by compressing first and second block halves oppositely and by using two decoders to decompress first and second block halves in parallel. Throughput is enhanced further by using extended codewords, each of which is a concatenation of class codes and symbol codes of several symbols.

26 Claims, 7 Drawing Sheets

U.S. PATENT DOCUMENTS 6,518,895 B1 * 2/2003 Weiss et al. .................. 341/67

OTHER PUBLICATIONS

Miretsky et al., "RISC code compression model", *Proc. Embedded Systems Conference*, Chicago IL, Mar. 1999).

A. Said and W. A. Perlman, in "Low-complexity waveform coding via alphabet and sample-set partitioning", *Visual Communications and Image Processing '97, Proc. SPIE* vol. 3024, pp. 25-37 (Feb. 1997).

C. Van Voorhis, Constructing codes with bounded codeword lengths, *IEEE Transactions on Information Theory* vol. 20 No. 3 pp. 288-290 (Mar. 1974).

A. Wolfe and A. Chanin in Executing compressed programs on an embedded RISC architecture, *Proc. Int'l Symp.On Microarchitecture*, pp. 81-91 (1992).

D. A. Huffman, "A method for the construction of minimum redundancy codes", *Proc. IRE* vol. 40 No. 9 pp. 1098-1101 (Sep. 1952).

T. M. Kemp et al., "A decompression core for PowerPC", *IBM Journal of Research and Development* vol. 42 No. 6 pp. 807-812 (Nov. 1998).

S. Schwartz and B. Kallick, "Generating a canonical prefix coding", *Communications of the ACM* vol. 7 no. 3 pp. 166-169 (Mar. 1964).

S. M. Lei and M. T. Sun, in "An entropy coding system for digital HDTV applications", *IEEE Transactions on Circuits and Systems for Video Technology* vol. 1 No. 1 pp. 147-155 (Mar. 1991).

S. Chang and D. G. Messerschmitt, in Designing high-throughput VLC decoder Part I—concurrent VSLI architectures, *IEEE Transactions on Circuits and Systems for Video Technology* vol. 2 No. 2 pp. 187-196 (Jun. 1992).

J. Ziv and A. Lempel, "A universal algorithm for sequential data compression ", *IEEE Transactions on Information Theory* vol. 23 No. 3 pp. 337-343 (May 1977).

* cited by examiner

| No. of symbols | Class structure |
|---|---|
| 8 | `00 bbb` |
| 32 | `01 bbbbb` |
| 64 | `100 bbbbbb` |
| 128 | `101 bbbbbbb` |
| 256 | `110 bbbbbbbb` |
| | `111 16-bit literal` |

| No. of symbols | Class structure |
|---|---|
| 1 | `00` |
| 16 | `01 bbbb` |
| 32 | `100 bbbbb` |
| 128 | `101 bbbbbbb` |
| 256 | `110 bbbbbbbb` |
| | `111 16-bit literal` |

FIG. 7

DEVICE AND METHOD FOR DECODING CLASS-BASED CODEWORDS

This is a continuation-in-part of U.S. Provisional Patent Application 60/278,868, filed Mar. 26, 2001.

FIELD AND BACKGROUND OF THE INVENTION

The present invention relates to the decompression of compressed datasets and, more particularly, to a device and method for decompressing datasets that have been compressed as class-based codewords.

Embedded microprocessors have become widely used in many products ranging from cellular telephones to digital video cameras to vehicular engine controllers. A typical system-on-a-chip (SOC) consists of a microprocessor core, on-chip memory and various peripherals according to the intended application. The on-chip program memory, usually ROM or flash memory, often occupies a substantial portion of the chip's area, sometimes close to half of the chip's area. As embedded software complexity increases to provide more functionality, the limited memory capacity of a SOC often is a restricting factor. Object code compression in a SOC offers the following tradeoff: investment in hardware (decompressor unit) helps to reduce the size of the software (application programs, real-time operating system) without reducing the functionality of the software.

In desktop systems or servers, text or binary files often are compressed to save both disk space and transfer time over a network from one system or server to another. Some popular file compression utilities use variants of the Lempel-Ziv window-based (J. Ziv and A. Lempel, "A universal algorithm for sequential data compression", *IEEE Transactions on Information Theory* vol. 23 no. 3 pp. 337–343 (May 1977)) or dictionary-based (T. A. Welch, "A technique for high-performance data compression", *IEEE Computer* vol. 17 no. 6 pp. 8–19 (June 1984)) algorithms. These methods are not suitable for use in embedded systems because these methods decode a compressed file from the beginning to the end, and do not support random reading and decoding of portions of the compressed file. Embedded systems must provide random access to compressed blocks of object code. Decompressing the entire program memory is not feasible because the size of the decompressed code exceeds the on-chip memory capacity.

The requirement of compressing short blocks that need to be accessed randomly limits the choice of compression methods. Huffman coding (D. A. Huffman, "A method for the construction of minimum redundancy codes", *Proc. IRE* vol. 40 no. 9 pp. 1098–1101 (September 1952)) has been used to compress programs in embedded systems (A. Miretsky et al., "RISC code compression model", *Proc. Embedded Systems Conference,* Chicago Ill., March 1999). Another variable-length-code compression method, class-based coding, also has been used in embedded systems, specifically, in IBM's 405 PowerPC core (T. M. Kemp et al., "A decompression core for PowerPC", *IBM Journal of Research and Development* vol. 42 no. 6 pp. 807–812 (November 1998)). In both of these examples, a compression utility produces blocks of compressed object code and a symbol table. The blocks of compressed object code and the symbol table are stored in the embedded system's memory. Blocks of compressed instructions are fetched and decoded to reconstruct the uncompressed program at run time. Huffman coding and class-based coding are defined below.

If an object file is considered as a sequence of 8-bit bytes, the alphabet consists of $2^8=256$ symbols. Alternatively, the same object file can be seen as a sequence of 16-bit symbols, in which case the alphabet size is $2^{16}=65,536$. Although the choice of 16-bit symbols would give better compression, especially if the object file consists of fixed-length 32-bit RISC instructions as in Kemp et al. (1998), maintaining a full Huffman tree with $2^{16}$ leaf nodes is expensive in terms of both storage space and coding speed.

Canonical coding (E. S. Schwartz and B. Kallick, "Generating a canonical prefix coding", *Communications of the ACM* vol. 7 no. 3 pp. 166–169 (March 1964)) eliminates the need for maintaining an explicit Huffman tree. (Although canonical coding creates a tree for code assignment, the tree is not used for coding and decoding.) Canonical coding creates an array of the alphabet symbols sorted in the order of their frequency of occurrence and a small table that specifies the "breakpoints" in the array of symbols where the code length changes. Coding is done by a straightforward computation using the sorted array of symbols and the table of breakpoints.

The use of canonical code simplifies coding and reduces space requirements; but if the alphabet is large relative to the size of the file to be coded, or if the file is broken up into blocks that are coded separately, then the amount of information that must be transferred for decoding still is a concern.

Another approach to address problems involving large alphabets is alphabet partitioning. Alphabet partitioning is a hierarchical decomposition strategy. The source alphabet is broken up into a number of "classes", and coding is done in two phases. In the first phase, a "class code" is assigned to every class. In the second phase, a "symbol code" is assigned to every symbol in the class. This two-phase coding allows the use of different coding methods for classes and symbols. Classes are entropy-coded with the goal of providing good compression efficiency. Symbols are coded using a very simple method (for example, the symbol code is just an index), with the goal of reducing coding complexity.

A. Said and W. A. Perlman, in "Low-complexity waveform coding via alphabet and sample-set partitioning", *Visual Communications and Image Processing '97, Proc. SPIE Vol.* 3024, pp. 25–37 (February 1997), present an analysis that shows that a good design requires partitioning with the following properties:

1. the symbols in a class occur very infrequently, or
2. the frequency distribution within a class is close to uniform.

Such a design realizes the full power of alphabet partitioning, and coding complexity is reduced at the cost of only a small loss in compression efficiency.

Huffman coding assigns variable-length codes to the symbols of an alphabet based on the frequency of occurrence of a symbol in the text or object file, with frequent symbols being assigned short codes. The following table is an example of Huffman code assignment for an eight-symbol alphabet:

| Symbol | Frequency | Codeword |
| --- | --- | --- |
| A | 0.5 | 0 |
| B | 0.15 | 110 |
| C | 0.11 | 100 |

-continued

| Symbol | Frequency | Codeword |
|---|---|---|
| D | 0.09 | 101 |
| E | 0.07 | 1110 |
| F | 0.05 | 11110 |
| G | 0.02 | 111110 |
| H | 0.01 | 111111 |

The average code length of this example is 2.26 bits.

Huffman codes have the "prefix property": no codeword is the prefix of another codeword. Conceptually, the decoding process begins from the root of the Huffman tree, and a branch of the tree is selected according to the next bit in the code. This process continues until a leaf node is reached. This leaf node contains or points to the decoded symbol. The prefix property guarantees uniquely decipherable codes.

S. M. Lei and M. T. Sun, in "An entropy coding system for digital HDTV applications", *IEEE Transactions on Circuits and Systems for Video Technology* vol. 1 no. 1 pp. 147–155 (March 1991), which is incorporated by reference for all purposes as if fully set forth herein, describe the design of a constant-output-rate decoder for compression systems in advanced television applications. This decoder, which is illustrated in FIG. 1 as decoder 10, decodes variable-length code at a constant output rate of one symbol per clock cycle. The core of decoder 10 is a programmable logic array (PLA) 22. Assuming an alphabet size of 2" symbols and the use of a bounded Huffman code (D. C. Van Voorhis, "Constructing codes with bounded codeword lengths, *IEEE Transactions on Information Theory* vol. 20 no. 3 pp. 288–290 (March 1974)) such that the longest codeword is at most w bits long, then PLA 22 implements a truth table with 2" product terms, w-bit wide input, and two outputs: the n-bit decoded symbol and the code word length encoded in $\log_2 w$ bits. An accumulator 20 adds up the codeword length for each decoded symbol and controls a barrel shifter 18. When accumulator 20 exceeds the maximum codeword length w, accumulator 20 produces a carry that transfers the contents of a first latch 14 to a second latch 16, and also loads w bits from an input buffer 12 to first latch 14.

S. Chang and D. G. Messerschmitt, in "Designing high-throughput VLC decoder Part I—concurrent VSLI architectures, *IEEE Transactions on Circuits and Systems for Video Technology* vol. 2 no. 2 pp. 187–196 (June 1992)), present a VSLI architecture and a parallel decoding method for variable-length-code decoders. While the primary application that they envision, and that Lei and Sun (1991) envision, is high-throughput video compression systems, their work is generally applicable to compression systems that use a prefix code.

Resuming the discussion of alphabet partitioning, one useful special case of alphabet partitioning is "class-based coding". In a class-based code, a "class" is a group of symbols that are assigned codes with the same length. Every symbol in the alphabet belongs to a single respective class. Every class is identified by a unique "class code". If a class consists of $2^q$ symbols, a q-bit "symbol code" is appended to the class code to identify each symbol that belongs to that class. A "codeword" consists of a class code followed by a symbol code.

FIG. 2 and the following table illustrate class-based coding for the eight-symbol alphabet that is used above to illustrate Huffman coding. As shown in FIG. 2, this code includes three classes. In each class there is a sequence of zero or more bits b that are used to encode the symbols of that class.

| Symbol | Frequency | Class | Codeword |
|---|---|---|---|
| A = 000 | 0.5 | 0 | 0 |
| B = 001 | 0.15 | 10b | 100 |
| C = 010 | 0.11 | 10b | 101 |
| D = 011 | 0.09 | 11bbb | 11011 |
| E = 100 | 0.07 | 11bbb | 11100 |
| F = 101 | 0.05 | 11bbb | 11101 |
| G = 110 | 0.02 | 11bbb | 11110 |
| H = 111 | 0.01 | 11bbb | 11111 |

The use of classes splits the decoding process into two phases. In the first phase, the code length is determined. In the second phase, the symbol code is decoded by accessing a lookup table. This simplifies decoding because class codes are short and the symbol code is just an index.

In this example, the last five symbols are "literals", i.e., symbols whose contents are not changed by the coding process. A literal is coded by simply prepending the class code to the symbol. In other words, the symbol code of a literal is the literal itself. The class of literals contains symbols that have the lowest frequencies. Literals are useful in coding large alphabets, especially if only a relatively small number of symbols have significantly large frequencies. This relatively small number of symbols is stored in a lookup table, and the rest of the symbols are coded as literals. The symbol codes of the symbols that are not literals are referred to herein as "index codes" because these symbol codes are used as indices to the lookup table.

Examples of embedded microprocessors that use code compression include the IBM PowerPC 405 core of Kemp et al. (1998) and the Motorola MPC 555 of Miretsky et al. (1999). The Motorola chip implements Huffman code. IBM's CodePack is a class-based implementation that is discussed in more detail below. To locate variable-length blocks in compressed memory, the IBM design implements an address table similar to the one proposed by A. Wolfe and A. Chanin in "Executing compressed programs on an embedded RISC architecture, *Proc. Int'l Symp. On Microarchitecture*, pp. 81–91 (1992). This approach has the advantage that compression is transparent to the processor, which produces addresses to uncompressed memory. The Motorola design involves changes in the PowerPC core in order to directly address bit-aligned instructions in compressed memory.

Prior art decoder 10 is intended for decoding 8-bit symbols and a maximum codeword length of sixteen bits. The corresponding size of PLA 22 is reasonable: 16-bit input, 12-bit output (8-bit symbol and 4-bit codeword length) and 256 product terms. This design is not suitable for an alphabet size of $2^{16}$ symbols because PLA 22 would require 65,536 product terms. There is thus a widely recognized need for, and it would be highly advantageous to have, a decoder capable of decoding 16-bit symbols, for use, for example, in an embedded processor with 32-bit RISC instructions.

SUMMARY OF THE INVENTION

Although the principles of the present invention are applicable to alphabet-partitioned encoding and decoding generally, the focus herein is on class-based encoding and decoding. The terms "compression" and "encoding" are used interchangeably herein. Similarly, the terms "decompression" and "decoding" are used interchangeably herein.

It is an object of the present invention to provide a class-based decoder that can handle an alphabet size of $2^{16}$ or more symbols.

It is an object of the present invention to provide a class-based decoder with codebook programmability.

It is an object of the present invention to provide a class-based decoder with high throughput. High throughput decompression is desirable to reduce the miss penalty in a system that uses an instruction cache, and to reduce the instruction fetch time in a system that does not use an instruction cache.

According to the present invention there is provided a codeword decoder for decoding one of a plurality of codewords, each codeword including a class code and a symbol code selected from the group consisting of literals and index codes, the codeword decoder including: (a) a symbol memory for storing symbols corresponding to respective index codes; (b) a class code decoder for extracting, from the codeword, information for decoding the symbol code of the codeword, the information for decoding the symbol code of the codeword including: (i) an indication of whether the symbol code of the codeword is a literal, and (ii) if the symbol code of the codeword is an index code, information related to an address in the symbol memory of the respective symbol of the index code; and (c) a symbol code decoder for receiving the codeword and for decoding the symbol code of the codeword, based on the information for decoding the symbol code of the codeword.

According to the present invention there is provided a method of decoding one of a plurality of codewords, each codeword including a class code and a symbol code selected from the group consisting of literals and index codes, each index code corresponding to a respective symbol, the method including the steps of: (a) storing the symbols in a memory; (b) computing, from the class code of the codeword, information for decoding the symbol code of the codeword, the information including: (i) an indication of whether the symbol code of the codeword is a literal, and (ii) if the symbol code of the codeword is an index code, information related to an address in the memory of the respective symbol of the index code; and (c) if the symbol code of the codeword is an index code, reconstructing the address from the information related to the address.

According to the present invention there is provided a codeword decoder for decoding one of a plurality of codewords, each codeword including a plurality of class codes and a like plurality of symbol codes, each symbol code being selected from the group consisting of literals and index codes, the codeword decoder including: (a) a class code decoder for extracting, from the codeword, information for decoding the symbol codes of the codeword; and (b) a like plurality of symbol code decoders, each symbol code decoder for receiving the codeword and for decoding a respective symbol code of the codeword, based on a respective portion of the information.

According to the present invention there is provided a method of encoding a plurality of symbols, including the steps of: (a) encoding each symbol separately as: a respective class code and a respective symbol code; and (b) concatenating the class codes and the symbol codes to provide a codeword.

According to the present invention there is provided a method of encoding a plurality of blocks, each block including 2N symbols, where N is a positive integer, including the steps of: (a) for each block: (i) compressing a first N symbols of the each block to provide N first codewords, (ii) compressing a second N symbols of the each block to provide N second codewords, the N second codewords being compressed oppositely to the compressing of the N first codewords, and (iii) concatenating the N first codewords with the N second codewords to provide a compressed block; and (b) storing the compressed blocks consecutively in a memory.

A basic codeword decoder of the present invention includes three components: a symbol memory for storing the lookup table of the most commonly encountered symbols, a class code decoder for decoding class codes, and a symbol code decoder for decoding symbol codes. The class code decoder extracts, from each input codeword, information that the symbol code decoder needs to decode the symbol code. This information includes an indication of whether the symbol code is a literal or an index code, and, if the symbol code is an index code, information related to the address of the corresponding symbol in the symbol memory. The symbol code decoder reconstructs the address from this information. For example, if the class codes are created by Huffman coding, the class code decoder of the present invention is similar to decoder 10, with PLA 22 modified to produce the information needed by the symbol code decoder.

Preferably, the information related to the address of a symbol in the symbol memory includes a high-order portion of the address and information related to a low-order portion of the address. The symbol code decoder includes a mechanism for computing the low-order portion of the address from the low-order-portion information. Preferably, the low-order-portion information includes a codeword length and a mask control word, and this mechanism includes a rotate left unit for aligning the codeword according to the codeword length and a mask unit for masking the aligned codeword according to the mask control word to extract the low-order portion of the address from the codeword. The symbol code decoder also includes a mechanism for combining the high-order and low-order portions of the address to recover the full address.

As noted above, one of the primary applications of the codeword decoder of the present invention is to the decompression of compressed code. A pair of basic codeword decoders of the present invention is used in a computer of the present invention to decompress blocks of compressed code in parallel. To this end, the computer includes a code memory in which the blocks are stored as first and second half-blocks, with each half-block including at least one code word. One codeword decoder is used to decode only the first half-blocks. The other codeword decoder is used to decode only the second half-blocks. The address of each first half-block is the beginning address of the block of which that first-half block is a part. The address of each second half-block is the beginning address of the block immediately subsequent to the block of which that second half-block is a part. For the purpose of defining an address of the last half-block, the blocks of compressed code are considered to be followed by a phantom block, and the address of the last second half-block is the beginning address of this phantom block. The computer also includes an address translation table in which only references to these addresses are stored.

Further decompression parallelism is obtained using a more sophisticated "compound" codeword decoder of the present invention, along with a correspondingly redefined codeword. As noted above, a prior art class-based codeword includes one class code and one symbol code. According to the present invention, the definition of "codeword" is extended to include a codeword suitable for encoding a plurality of symbols by concatenating the class codes and the symbol codes of the symbols. The corresponding codeword decoder includes a class code decoder for extracting, from a compound codeword, information for decoding the symbol codes. This codeword decoder also includes as many symbol code decoders as there are symbol codes in the codeword. Each symbol code decoder receives the codeword and decodes a corresponding symbol code based on the relevant portion of the information.

Preferably, the class code decoder includes a PLA for computing, from the concatenated class codes, a class code combination number, as well as a symbol class number for each of the concatenated symbol codes. Preferably, the class code decoder also includes as many symbol class number translators as there are symbol codes in the codeword. Each symbol class number translator translates one of the symbol class numbers into the information that a corresponding symbol code decoder needs to decode the corresponding symbol code.

Preferably, the compound codeword includes two concatenated portions: a first portion that includes the concatenated class codes and a second portion that includes the concatenated symbol codes. The class code decoder operates on the first portion of the codeword. The symbol code decoders operate on the second portion of the codeword.

Preferably, the compound codeword decoder also includes, for each symbol code decoder, a corresponding symbol code memory for storing a lookup table of the most commonly encountered symbols. The information, that the symbol code decoder uses to decode its corresponding symbol code of the codeword, includes an indication of whether the symbol code is a literal or an index code, as well as, if the symbol code is an index code, information related to the address of the corresponding symbol in the symbol code memory. The latter information includes a high-order portion of the address and information related to a low-order portion of the address. Each symbol code decoder includes a mechanism for computing the low-order portion of the address from the low-order-portion information. Preferably, the class code decoder also includes a class code number translator for translating the class code combination number into a total length of the concatenated class codes; the low-order-portion information includes a length of the symbol code; and the mechanism includes a rotate left unit for aligning the codeword, based on the total length of the concatenated class codes and on the length of the symbol code, as well as a mask unit for masking the aligned codeword according to the length of the symbol code to extract the low-order portion of the address. Most preferably, for all symbol codes other than the first symbol code, the low-order-portion information also includes the lengths of all the preceding symbol codes, and the aligning is also based on the lengths of the preceding symbol codes. Each symbol code decoder also includes a mechanism for combining the high-order portion of the address and the low-order portion of the address to recover the address.

Similar to the computer of the present invention that includes a pair of basic codeword decoders of the present invention, a second computer of the present invention includes a pair of compound codeword decoders of the present invention for obtaining still more decompression parallelism. Also as in the case of the basic computer of the present invention, this second computer includes a code memory in which blocks of compressed code are stored as first and second half-blocks, with each half-block including at least one code word; and also an address table that stores only addresses, each of which (except for a first address and a last address) points to the second half-block of one block and the first half-block of the immediately subsequent block. Half-blocks are retrieved from the code memory and then decoded substantially simultaneously by the two codeword decoders in substantially the same way as in the basic computer of the present invention, the principal difference being that each codeword includes a plurality of class codes and symbol codes for a plurality of symbols.

The methods that are used to compress, store and decompress code in the computers of the present invention are applicable to compressing, storing and decompressing blocks of symbols generally, as long as all the blocks contain the same even number (2N) of symbols. For each block, the first N symbols are compressed to provide N first codewords, and the second N symbols are compressed oppositely to the compression of the first N symbols, to provide N second codewords. The N first codewords and the N second codewords are concatenated to provide a compressed block. The compressed blocks are stored consecutively in a memory. An address translation table is provided that includes only references to beginning addresses of the compressed blocks. Note that the beginning address of every compressed block other than the first compressed block is also the ending address of the immediately preceding compressed block. For the purpose of defining an ending address of the last compressed block, the compressed blocks are considered to be followed in the memory by a phantom compressed block whose beginning address is the ending address of the last compressed block. The compressed blocks are retrieved from the memory sequentially, using only the address references stored in the address translation table. For each retrieved compressed block, the first N codewords and the second N codewords are decoded substantially simultaneously.

BRIEF DESCRIPTION OF THE DRAWINGS

The invention is herein described, by way of example only, with reference to the accompanying drawings, wherein:

FIG. 7 shows the class structures of CodePack compressed code.

DESCRIPTION OF THE PREFERRED EMBODIMENTS

The present invention is of a class-based codeword decoder which can be used to decompress codewords corresponding to relatively large symbol alphabets. Specifically, the present invention can be used to decompress compressed code in embedded microprocessors.

The principles and operation of a class-based codeword decoder according to the present invention may be better understood with reference to the drawings and the accompanying description.

Figure 1:
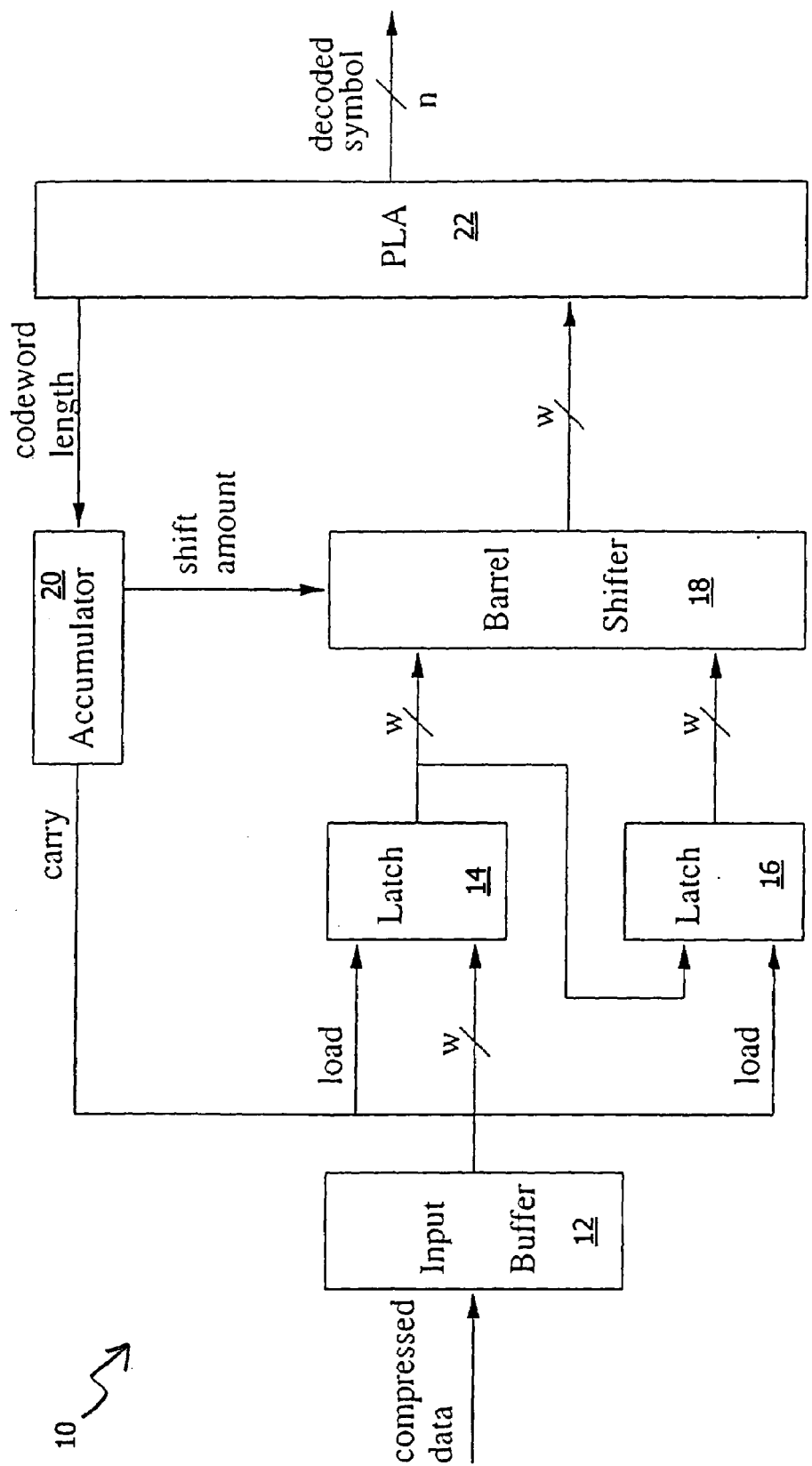
FIG. 1 illustrates a prior art decoder for decoding Huffman code.
Figure 2:
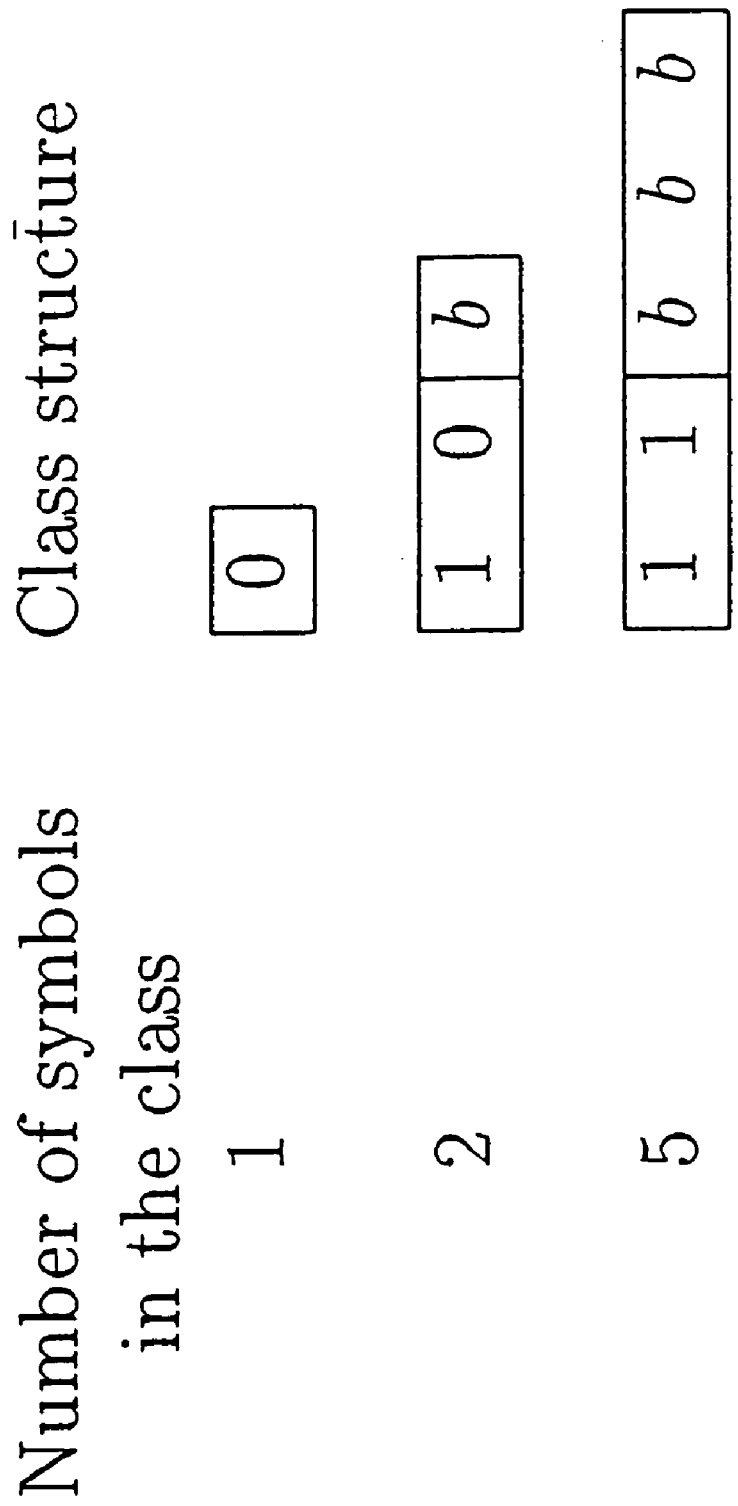
FIG. 2 shows a simple example of class-based coding.
Figure 3:
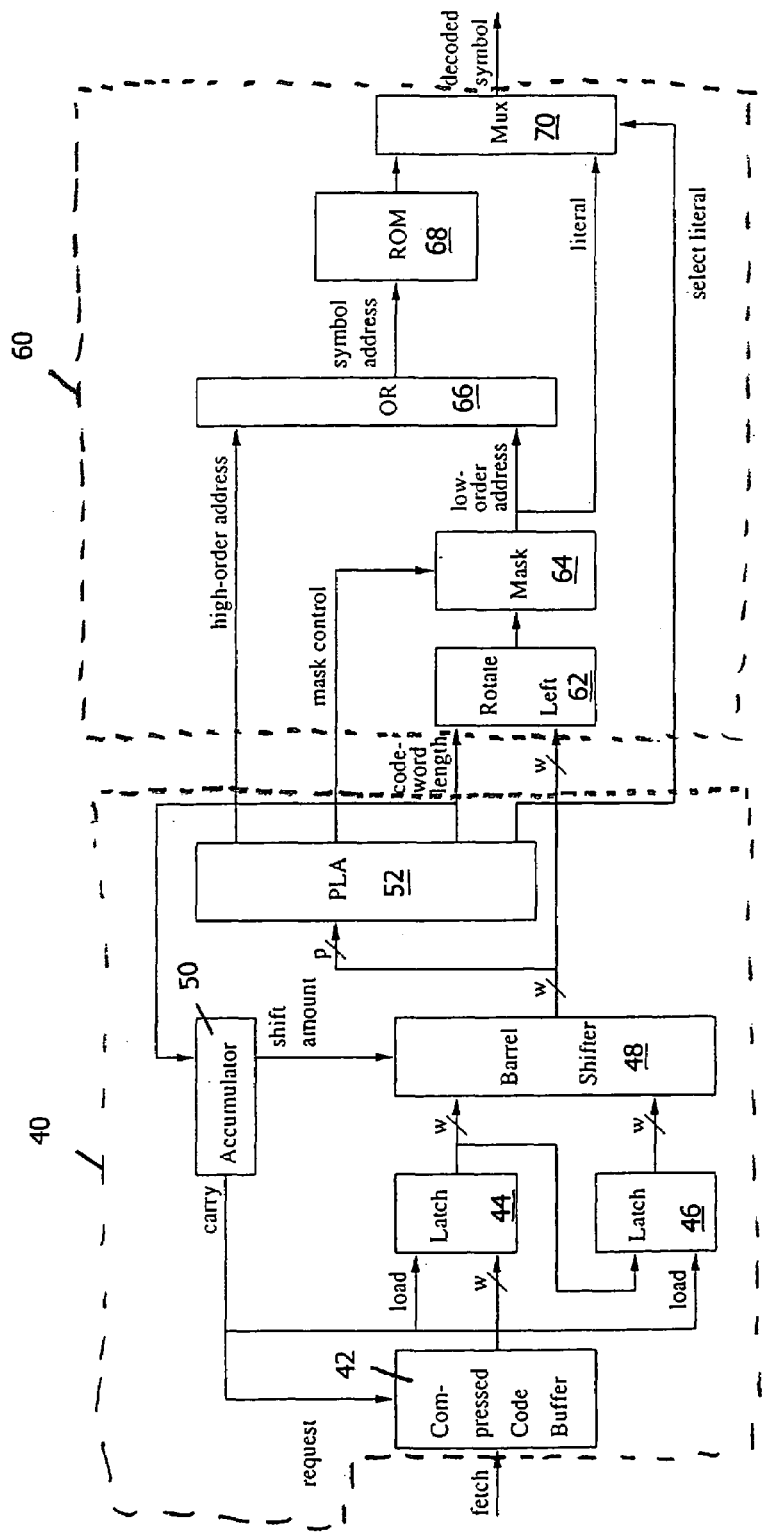
FIG. 3 illustrates a basic codeword decoder of the present invention.

Referring again to the drawings, FIG. 3 illustrates a basic codeword decoder 30 of the present invention. Codeword decoder 30 includes a class code decoder 40 and a symbol code decoder 60. For each input codeword, class code decoder 30 extracts information from the codeword that is needed by symbol code decoder 60 to decode the symbol code of the codeword, and symbol code decoder 60 uses this information to decode the symbol code of the codeword. It is assumed that the class codes are encoded using Huffman coding, that the longest codeword is w bits long and that the longest class code is p bits long. (The longest class code is usually, but not necessarily, the literal class code.)

Class code decoder 40 is based on prior art decoder 10. The components of class code decoder 40 are functionally identical to the components of prior art decoder 10: compressed code buffer 42 is functionally identical to input buffer 12; latches 44 and 46 are functionally identical to latches 14 and 16; barrel shifter 48 is functionally identical to barrel shifter 18 and accumulator 50 is functionally identical to accumulator 20. PLA 52 is functionally similar to PLA 22, but is used to decode only the class code of each input codeword, not the entire codeword. Specifically, instead of receiving all w bits output from barrel shifter 48 as input, PLA receives as input only the first p most significant bits output from barrel shifter 48; and instead of outputting a class code length and a decoded class code, PLA 52 outputs a codeword length and three other outputs that symbol code decoder 60 needs to decode the symbol code, as described below. This allows PLA 52 to be smaller than otherwise, despite a large alphabet size of the encoded symbol set, because the number of product terms is equal to the number of classes, not the number of symbols in the alphabet.

Symbol code decoder 60 includes a memory 68, a rotate left unit 62, a mask unit 64, an OR gate 66 and a multiplexer 70. Memory 68 is shown as a read-only memory (ROM), which is the preferred configuration, although memory 68 could be any kind of on-chip memory, for example a random access memory. ROM 68 stores a lookup table of the most frequently used symbols. ROM 68 is relatively small because the lookup table typically includes only 512 or 1024 symbols. The remaining symbols are encoded as literals.

The four outputs of PLA 52 are:

1. Codeword length.
2. Mask control (the number of 1's in the mask).
3. If the symbol code is an index code, the high-order portion of the address of the corresponding symbol in ROM 68. This high-order portion is the address in ROM 68 of the block that includes the symbols of the decoded class.
4. If the symbol code is a literal, a "select literal" signal.

The codeword length is used as a rotate left control in rotate left unit 62. Before the rotate operation, the order of the code bits is [class code][symbol code][extra (unused) bits]. After the rotation operation, the order of the code bits is [extra (unused) bits][class code][symbol code]. The result is a right-aligned codeword that is input to mask unit 64. The mask control is sent to mask unit 64, which clears the class-code and the extra (unused) bits in the input aligned codeword. The output of mask unit 64 is a word that contains a single right-aligned symbol code (i.e., a codeword stripped of its class code) padded with zeros up to the length of the longest symbol code.

If the "select literal" symbol is active, then the output of mask unit 64 is a literal, which is selected by multiplexer 70 as the output of codeword decoder 30. Otherwise, the output of mask unit 64 is interpreted as the low-order bits of the address of the desired symbol in ROM 68. These bits are ORed with the high-order address bits from PLA 52 in OR gate 66 to produce the address in ROM 68 of the desired symbol. The desired symbol then is selected by multiplexer 70 as the output of codeword decoder 30.

The following table presents the complexity of PLA 52:

| | | PLA Output (no. bits) | | | |
|---|---|---|---|---|---|
| PLA input (no. bits) | Select Literal | Rotate Control (codeword length) | Mask Control | High-Order ROM Address | No. of Product Terms |
| p | 1 | $\log_2 w$ | $\log_2(w-1)$ | r | c |

One advantage of codeword decoder 40 over prior art decoder 10 derives from the use of class-based codewords instead of Huffman codewords. This advantage is codebook programmability. In prior art decoder 10, any modification of the codebook requires changes in the specification of PLA 22. This implies that the PLA optimization software used to design PLA 22 must be run again, with results that are difficult to predict in terms of the PLA area. Such changes normally are not done after a custom-designed chip becomes a product. This also is a limitation of the variable I/O rate decoder of Chang and Messerschmitt (1992). In the present invention, the specification and implementation of PLA 52 are fixed. The compression algorithm is adapted to the symbol frequency statistics of various binary programs by modifying the symbol codebook of ROM 68, which is fully programmable.

The following table illustrates the PLA specification for the class-based code example discussed in the Field and Background section:

| | | PLA Output | | |
|---|---|---|---|---|
| PLA Input (contains at least one class-code) | Select Literal | Rotate Control (codeword length) | Mask Control (codeword length less class-code length) | High-Order ROM Address Bits |
| 0x | 0 | 000 | 00 | 00 |
| 10 | 0 | 010 | 01 | 10 |
| 11 | 1 | 100 | 11 | xx |

Because the shortest codeword is one bit long, codeword length 000 denotes a 1-bit (the shortest) codeword, and codeword length k is interpreted as a length of k+1 bits.

When "Select Literal" is 1, the symbol itself is contained in the codeword following the class code, and the ROM address is "don't care" because the output of ROM 68 is not selected by multiplexer 70 as the output of codeword decoder 30.

The following table shows the corresponding contents of ROM 68:

| Class | Codeword | High-Order Bits (PLA Output) | ROM Address Low-Order Bits (Rotate Output) | Full Address (OR Output) | ROM Contents (Decoded Symbol) |
|---|---|---|---|---|---|
| 0 | 0 | 00 | 00 | 00 | A |
| 10b | 100 | 10 | 00 | 10 | B |
| 10b | 101 | 10 | 01 | 11 | C |

The other five symbols (D, E, F, G, H) are literals.

Although decoded blocks have a fixed length, compressed blocks have variable lengths and are located at random locations in memory. To fetch instructions, the processor issues the same addresses that would be issued to access uncompressed memory; and an address translation method such as that of Wolfe & Chanin (1992) is used to map block addresses to memory locations in compressed memory. The address translation table provides the beginning address of compressed blocks in memory.

The beginning address of a block is also the end address of the immediately preceding block. Assuming uncompressed blocks contain a constant, even number of symbols (which is the normal case whether the symbols are 8-bit bytes or 16-bit words because the number of bytes in a cache block is a power of two), the compression process is modified as follows:

The uncompressed block is divided into two halves, each half having the same number of symbols. The two half-blocks are compressed separately. The first half-block is compressed from its first symbol to its last symbol, as is normally done. The second half-block is compressed from its last symbol to its first symbol. In addition, the bit orders of the resulting codewords of the second half-block are reversed. This combination of compressing the symbols of the second half-block in reverse order and reversing the bit order of the resulting codewords constitutes an example of compressing the symbols of the second half-block "oppositely" to the compression of the symbols of the first half-block. The compressed block is the concatenation of the two compressed half-blocks. The bit order in the compressed block goes from the most significant bit of the first compressed half-block (the most significant bit of the first codeword of the first compressed half-block) through the least significant bit of the first compressed half-block (the least significant bit of the last codeword of the first compressed half-block), followed immediately by the least significant bit of the second compressed half-block (the least significant bit of the last codeword of the second compressed half-block) through the most significant bit of the second compressed half-block (the most significant bit of the first codeword of the second compressed half-block). The two compressed half-blocks are decoded in parallel, by reading the first half-block from its most significant bit to its least significant bit starting from the beginning address of the compressed block, and by reading the second half-block from its most significant bit to its least significant bit starting from the ending address of the compressed block, which is identical to the beginning address of the immediately subsequent compressed block.

When a block is decoded, each of its half-blocks is decoded by one of two codeword decoders 30. The oppositely-ordered compression of the two half-blocks allows the two half-blocks to be addressed using only beginning addresses of the compressed blocks (including a beginning address, of a phantom compressed block, that serves as an ending address of the last actual compressed block). Without this type of compression, simultaneous decoding of two half-blocks could be achieved only by providing addresses of all the half-blocks, thereby doubling the size of the address translation table.

Further reduction in the size of the address translation table is obtained by storing the base addresses of groups of blocks along with sizes of the blocks of the groups, as proposed by Wolfe and Chanin (1992). Each entry of the address translation table consists of a base address of a group of m blocks followed by m fields, with each field specifying the length of the corresponding block. The base address is the address of the first block in the group. The addresses of the other blocks of the group are computed by summing the lengths of the preceding blocks to the base address. The following table is an example of an address translation table entry for a 32-bit base address and m=8 block lengths in eight block length fields labeled B0 through B7.

| Base Address | B0 | B1 | B2 | B3 | B4 | B5 | B6 | B7 |
|---|---|---|---|---|---|---|---|---|
| 32 bits | 6 bits | 6 bits | 6 bits | 6 bits | 6 bits | 6 bits | 6 bits | 6 bits |

Six bits suffices to store integers between 0 and 63. A block length between 1 and 63 is interpreted as a compressed block length in bytes. Occasionally in the coding process, a block may be left uncompressed at its original size of 64 bytes, for example if the block contains many literals. Such an uncompressed block is indicated by a "0" in the block length field.

This combination of a base address with block sizes is considered herein to be a set of references to the beginning addresses of the blocks of the group. In the trivial case of one block per group, in which all the beginning addresses are stored explicitly, each address is considered to be a reference to itself.

Figure 4:
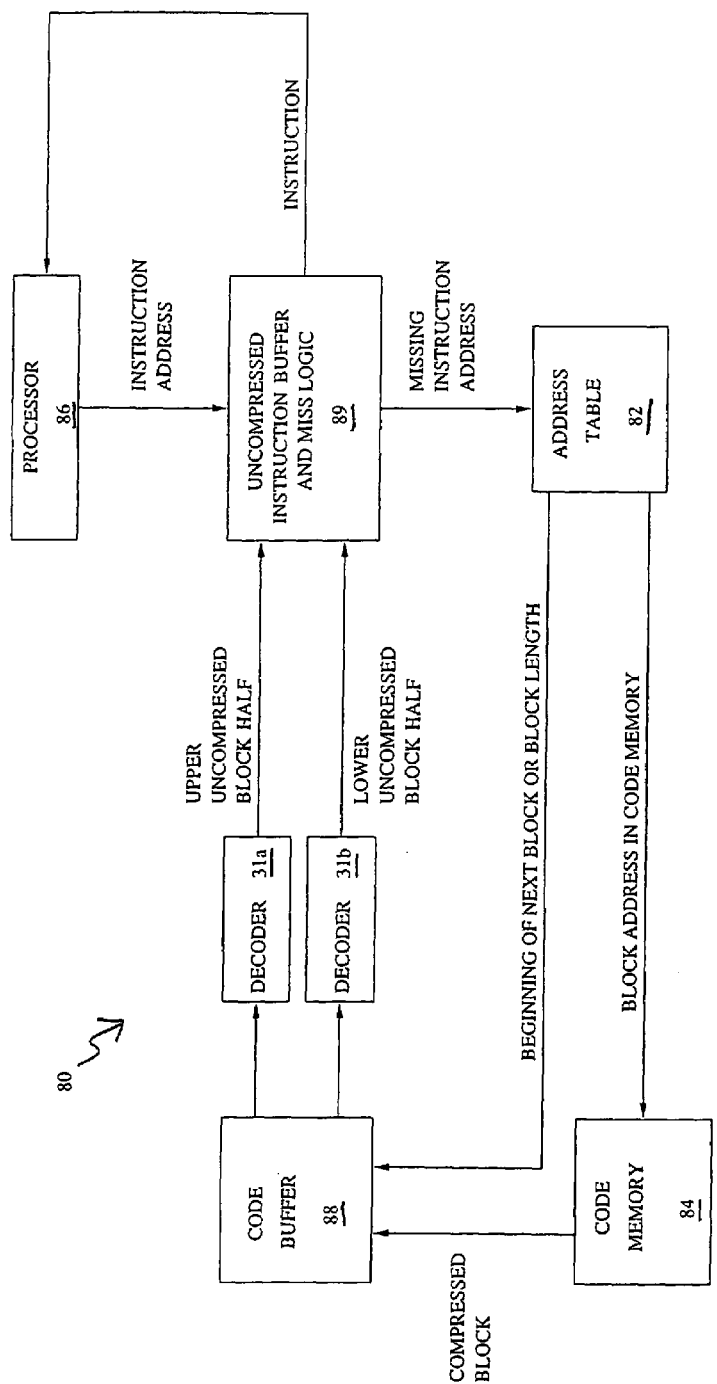
FIG. 4 is a partial block diagram of a computer of the present invention configured with two codeword decoders for parallel decoding.

FIG. 4 is a partial block diagram of a computer 80 of the present invention configured with two basic codeword decoders 31a and 31b of the present invention as described above. Blocks of compressed code are stored in a code memory 84. The starting addresses of the blocks of compressed code are stored in an address translation table 82. A processor 86 executes code that is decompressed by decoders 31a and 31b. Because processor 86 executes decompressed code, processor 86 fetches instructions to execute according to addresses of decompressed code. For this purpose, processor 86 sends addresses of needed decompressed code to an uncompressed instruction buffer and miss logic module 89. The uncompressed instruction buffer in module 89 typically is implemented as a buffer that stores one or more uncompressed blocks. Alternatively, the uncompressed instruction buffer in module 89 is implemented as an instruction cache. An instruction cache can store a larger number of uncompressed blocks than a simple buffer. Each instruction address received by module 89 includes an uncompressed block address and a byte address, within the uncompressed block, of the first byte of the instruction. Module 89 determines whether the uncompressed instruction buffer of module 89 contains the requested instruction. If the uncompressed instruction buffer of module 89 does contain the requested instruction, module 89 sends that instruction to processor 86 for execution. If the uncompressed instruction buffer of module 89 does not contain the requested instruction, module 89 finds the starting address of the corresponding block of compressed code and the starting address of the immediately succeeding block of compressed code (or equivalently the ending address of the corresponding block of compressed code) in address translation table 82. The starting address of the block to be decompressed is used to transfer that block to a compressed code buffer 88. Because a fixed number of bytes, equal to the length of the longest compressed block, always is transferred from code memory 84 to compressed code buffer 88, code buffer 88 also receives an indication of the length of the compressed block, for example the starting address of the immediately succeeding compressed block, or the length of the compressed block itself. Decoders 31 are identical to decoder 30 except for sharing a common code buffer 88. Decoder 31a reads and decodes the first half of the block. Decoder 31b reads and decodes the second half of the block. The symbols decoded by decoders 31a and 31b are sent to module 89, which extracts the requested instruction from the decompressed block and sends the requested instruction to processor 86 for execution.

For example, in a typical computer 80, the addresses of uncompressed instructions are 32 bits long, and uncompressed blocks are 64 bytes long. In each uncompressed instruction address, the 26 most significant bits are the block address of the instruction and the 6 least significant bits are the byte address, within the block, of the first byte of the instruction. Module 89 uses the 26 most significant bits of the uncompressed instruction address to access address translation table 82 and uses the 6 least significant bits of the uncompressed instruction address to locate the requested instruction within the decompressed block.

The throughput of basic codeword decoder 30 can be increased by increasing the PLA complexity. The PLA can be used to decode the equivalent of two prior art codewords at once by specifying the PLA as a table of all possible combinations of two class codes. To facilitate this, it is necessary to expand the definition of a codeword. Letting P represent the class code of a symbol and S represent the symbol code of a symbol, the corresponding prior art codeword is PS. According to the prior art, two symbols, symbol 1 and symbol 2, are encoded as two concatenated codewords: $P_1S_1P_2S_2$. Instead, according to the present invention, the two symbols are encoded as a single compound codeword: $P_1P_2S_1S_2$. If the class codes are at most p bits long then the 2p input bits of the PLA contain the two class-codes and possibly some extra bits. As before, the longest codeword is w bits long and the shortest class code is one bit long. The resulting complexity of a straightforward generalization of PLA 52 is shown in the following table. c is the number of classes, and there are $2^r$ symbols in the ROM.

| PLA Input (no. bits) | Select Literal Codeword 1 & 2 | PLA Output (no. bits) | | | | High-Order ROM Address Codeword 1 & 2 | No. of Product Terms |
| | | Rotate Control Codeword 1 | Rotate Control Codeword 2 | Mask Control Codeword 1 | Mask Control Codeword 2 | | |
| --- | --- | --- | --- | --- | --- | --- | --- |
| 2p | 2 | $\log_2 w$ | $\log_2 2w$ | $\log_2(w-1)$ | $\log_2 2(w-1)$ | 2r | $c^2$ |

More generally, a compound codeword of the present invention, for n symbols, is $P_1P_2 \ldots P_nS_1S_2 \ldots S_n$, where $P_1$ and $S_1$ are the class code and symbol symbol i. The complexity of a straightforward generalization of PLA 52 increases very rapidly with n. The PLA size can be controlled to a certain extent by reducing the number of output bits. The resulting PLA generates n+1 output fields:

1. One field that enumerates the combinations of class-codes $P_1P_2 \ldots P_n$. Combinations that give the same length of class-codes are considered identical.
2. n fields that contain the class number of each of the n symbols. The c classes are numbered 0 through c-1.

The following table shows the complexity of the resulting PLA:

| PLA Input (no. bits) | PLA Output (no. bits) | | No. of Product Terms |
| | Class codes $P_1P_2 \ldots P_n$ Combination no. | Symbol class no. for n symbols | |
| --- | --- | --- | --- |
| np | $\log_2$(no. of possible combinations) | $n\log_2 c$ | $c^n$ |

Figure 5:
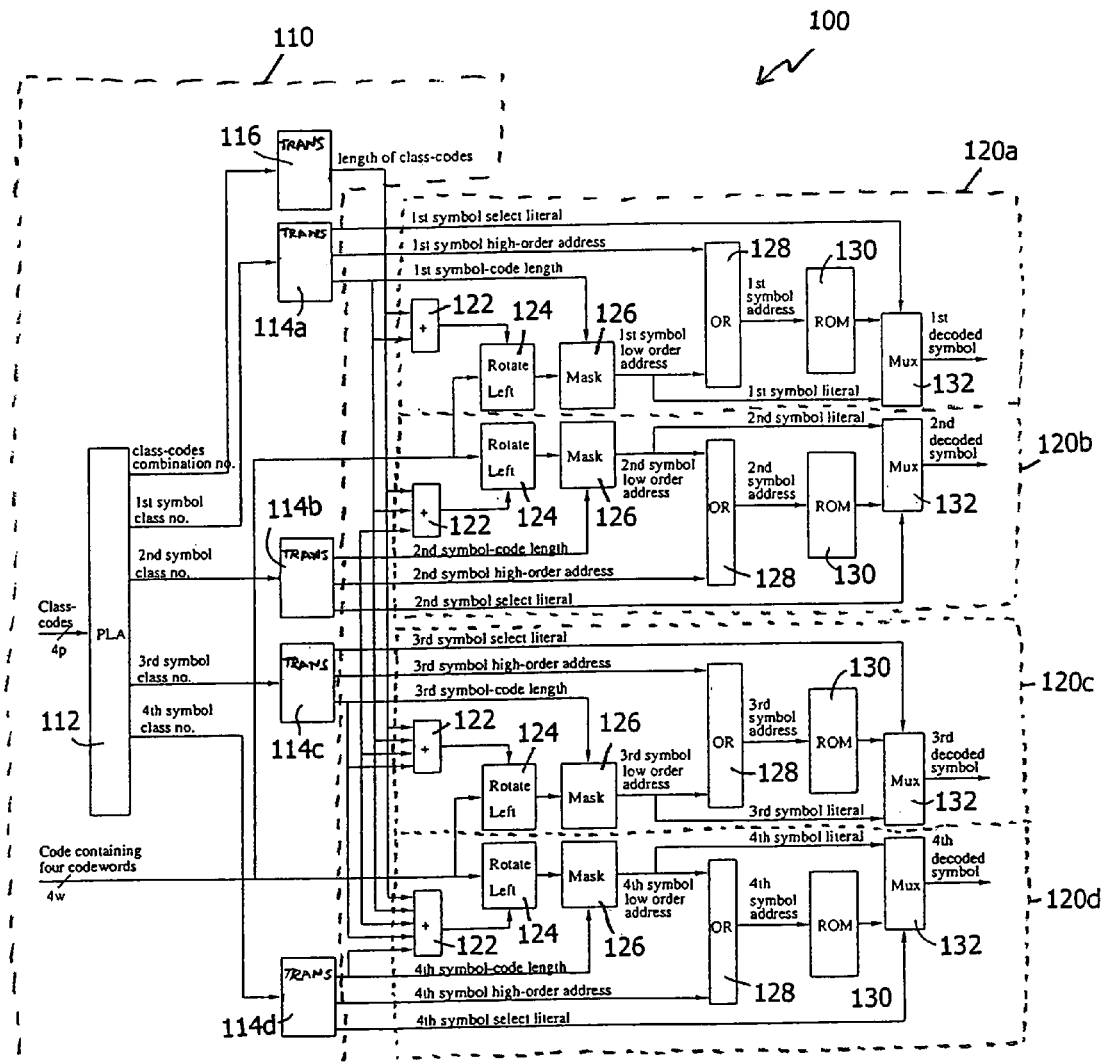
FIG. 5 illustrates a compound codeword decoder of the present invention.

FIG. 5 illustrates a compound codeword decoder 100 for decoding an n=4 compound codeword. Codeword decoder 100 includes a class code decoder 110 and four symbol code decoders 120a, 120b, 120c and 120d.

Class code decoder 100 includes a reduced-number-of-output-bits PLA 112. The outputs of PLA 112 are, for each input compound codeword, the corresponding class code combination number and the symbol class numbers of the four encoded symbols. Class code decoder 100 also includes a class code combination number translator 116 and, for each symbol code decoder 120, a respective symbol class number translators 114. Class code combination number translator 116 translates the class code combination number into the total length of the concatenated class codes $P_1P_2P_3P_4$. Each symbol class number translator 114 translates the symbol class number of the corresponding symbol into information that the corresponding symbol code decoder 120 needs to decode the corresponding symbol code, as described below. Class code decoder 100 also includes components for preparing the input to PLA 112, including a compressed code buffer, two latches, a barrel shifter and an accumulator, as in class code decoder 40. For illustrational simplicity, these components are not shown in FIG. 5.

Each symbol code decoder 120 includes a ROM 130, an adder 122, a rotate left unit 124, a mask unit 126, an OR gate 128 and a multiplexer 132. All ROMs 130 store identical lookup tables of the most frequently used symbols. The remaining symbols are encoded as literals.

The three outputs of each symbol class number translator 114 are:

1. The length of the corresponding symbol code.
2. If the corresponding symbol code is an index code, the high-order portion of the address of the corresponding symbol in ROM 130.
3. If the symbol code is a literal, a "select literal" signal.

Each adder 122 adds the length of the corresponding symbol code to the total length of the concatenated class codes. Adders 122 of symbol code decoders 120b, 120c and 120d also add to this sum the lengths of the symbol codes of the symbols that are decoded by the preceding symbol code decoders, so that adder 122 of symbol code decoder 120b produces the sum of the total length of the concatenated class code and the lengths of the symbol codes of the symbols decoded by symbol code decoders 120a and 120b; adder 122 of symbol code decoder 120c produces the sum of the total length of the concatenated class code and the lengths of the symbol codes of the symbols decoded by symbol code decoders 120a, 120b and 120c; and adder 122 of symbol code decoder 120d produces the sum of the total length of the concatenated class code and the lengths of the symbol codes of the symbols decoded by symbol code decoders 120a, 120b, 120c and 120d. These sums are used as rotate left controls in rotate left units 124. The results are right-aligned codewords that are used as mask controls by mask units 126. Each mask unit 126 clears the class code and the extra bits in the input aligned codeword. The output of each mask unit 126 is a word that contains a single right-aligned symbol code padded with zeros up to four times the length of the longest symbol code.

For each symbol code decoder 120, if the "select literal" symbol is active, then the output of mask unit 126 is a literal, which is selected by multiplexer 132 as the output of that symbol code decoder 120. Otherwise, the output of mask unit 126 is interpreted as the low-order bits of the address of the desired symbol in ROM 130. These bits are ORed with the high-order address bits from the corresponding symbol class number translator 114 in OR gate 128 to produce the address in ROM 130 of the desired symbol. The desired symbol then is selected by multiplexer 132 as the output of that symbol code decoder 120.

Figure 6:
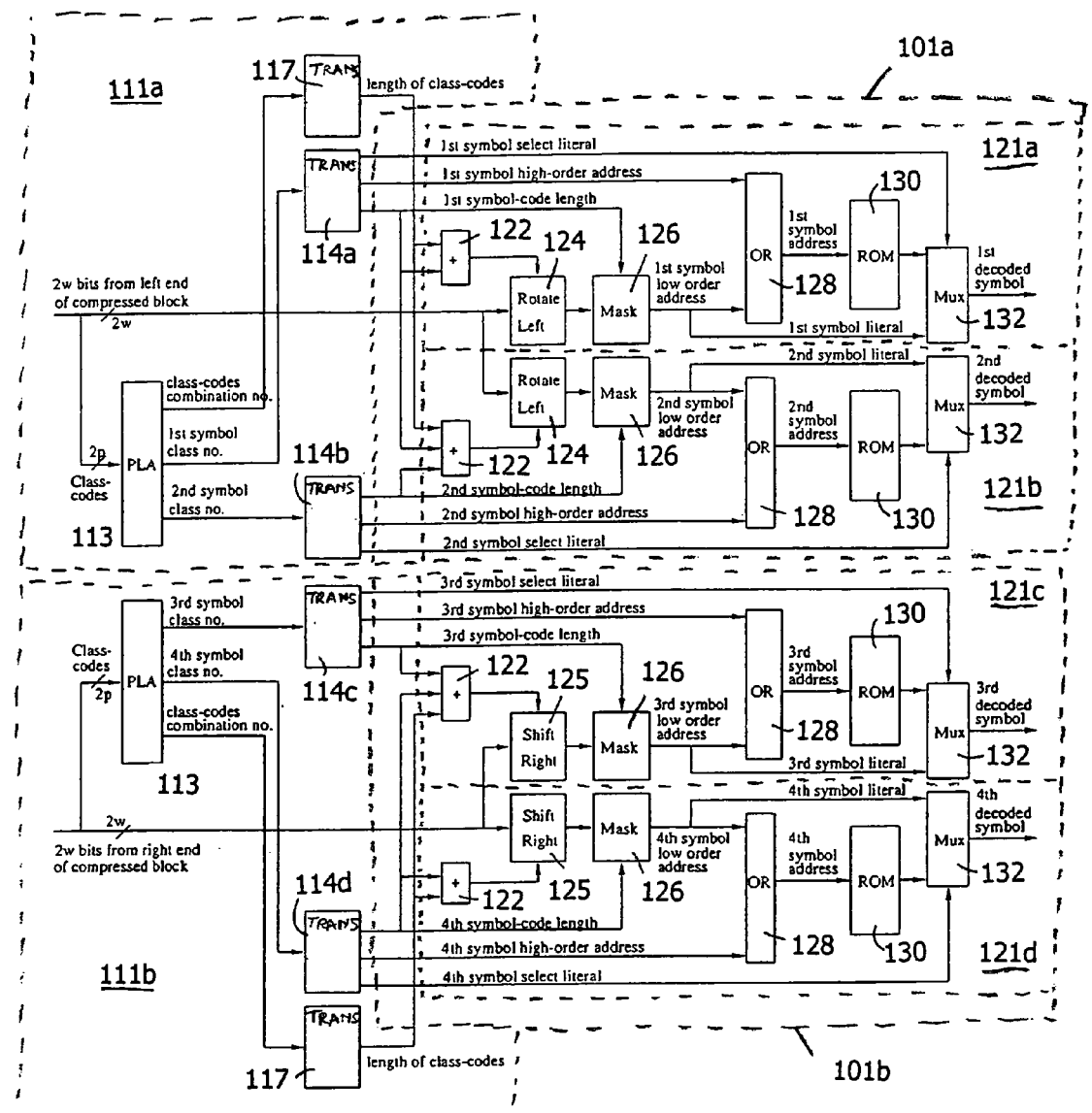
FIG. 6 illustrates two compound decoders for parallel decoding in the manner of FIG. 4.

The scalability of the PLA is improved further by using two compound codeword decoders whose class code decoders share a common compressed code buffer, in the manner of FIG. 4. FIG. 6 illustrates two such compound codeword decoders 101, each including a respective class code decoder 111 and two respective symbol code decoders 121. PLA 113 of each class code decoder 111 is an n=2 PLA. Similarly, class code combination translator 117 of each class code decoder 111 is an n=2 class code combination translator. Because the second compressed block-halves are compressed oppositely to the first compressed block-halves, symbol code decoders 121c and 121d include shift right units 125 instead of rotate left units 124. The remaining components of compound codeword decoders 101 are identical structurally and functionally to the corresponding components of compound codeword decoder 100.

FIG. 4 also serves to illustrate a computer of the present invention that uses compound codeword decoders 101 instead of basic codeword decoders 30.

What follows is an example of the application of the present invention to decompressing code compressed using the CodePack compression method of Kemp et al. (1998). CodePack is a class-based object code compression method first introduced in IBM's 405 PowerPC core. As in most other RISCs, PowerPC object code consists of fixed-length 32-bit instructions. As illustrated in FIG. 7, CodePack compression is done using different class structures for the left 16-bit halves and the right 16-bit halves of the instructions. In immediate-format instructions, the right instruction-half is used for constants. The zero constant, which occurs frequently enough to justify its own code, is the only symbol encoded in the first class of the right instruction halves.

There are six classes in CodePack (c=6), numbered 0 through 5. Three bits are required to encode the class number. 3n bits are required to encode the class numbers of n instruction halves. Class codes are either two bits long or three bits long. Therefore, as shown in the following table, the number of class-code lengths that give distinct lengths for the field of n class codes is quite small and may be encoded in one to four bits, depending on the number of symbols (instruction halves) decoded per cycle. This table is for PLAs, such as PLA 112, whose codeword decoders do not share a common compressed code buffer.

| n symbols (Instruction Halves) | PLA Input (bits) | PLA Output (bits) | | | | No. Minimized Product Terms Unified PLA | No. Minimized Product Terms Decomposed PLA |
| | | No. combinations Class codes | Symbol class no. | Total Output | No. Product Terms | | |
| --- | --- | --- | --- | --- | --- | --- | --- |
| 1 | 1 * 3 = 3 | 1 | 1 * 3 = 3 | 4 | 6 | 4 | 5 |
| 2 | 2 * 3 = 6 | 2 | 2 * 3 = 6 | 8 | 36 | 14 | 15 |
| 3 | 3 * 3 = 9 | 2 | 3 * 3 = 9 | 11 | 216 | 30 | 35 |
| 4 | 4 * 3 = 12 | 3 | 4 * 3 = 12 | 15 | 1296 | 92 | 75 |
| 5 | 5 * 3 = 15 | 3 | 5 * 3 = 15 | 18 | 7776 | 238 | 155 |
| 6 | 6 * 3 = 18 | 3 | 6 * 3 = 18 | 21 | 46,656 | 554 | 315 |

Without minimization, the number of PLA terms is $c^n$ for an n-symbol-per-cycle decoder with c classes. To reduce the number of PLA terms, two PLA configurations were minimized using Espresso (R. Brayton et al., *Logic Minimization Algorithms for VLSI Synthesis,* Kluwer Academic Publishers, 1984): (1) a unified PLA that produces all the output bits, and (2) a decomposed PLA which consists of two smaller PLAs: one that produces the class code combination numbers and another that generates the symbol class numbers for each of the n decoded symbols. Although the number of product terms before minimization is identical in both PLA configurations, the minimized decomposed PLA has fewer product terms for n>3.

PLA complexity is reduced further if two codeword decoders that share a common compressed code buffer, as in FIGS. 4 and 6, are used. This is shown in the following table:

| n symbols (Instruction Halves) | PLA Input (bits) | PLA Output (bits) | | | No. Product Terms | No. Minimized Product Terms Unified PLA | No. Minimized Product Terms Decomposed PLA |
|---|---|---|---|---|---|---|---|
| | | No. combinations Class codes | Symbol class no. | Total Output | | | |
| 2 | 2 * 3 = 6 | 2 | 2 * 3 = 6 | 8 | 12 | 8 | 10 |
| 4 | 4 * 3 = 12 | 4 | 4 * 3 = 12 | 16 | 72 | 28 | 30 |
| 6 | 6 * 3 = 18 | 4 | 6 * 3 = 18 | 22 | 432 | 60 | 70 |
| 8 | 8 * 3 = 24 | 6 | 8 * 3 = 24 | 30 | 2592 | 184 | 150 |

According to the complexity model of Chang and Messerschmitt (1992), the PLA's chip size is proportional to (2I+O)T where I is the number of PLA input bits, O is the number of PLA output bits and T is the number of PLA product terms. In a typical 32-bit RISC instruction set architecture, the n=8 parallel decoding of eight symbols corresponds to a decompression rate of sixteen bits per decoding cycle.

While the invention has been described with respect to a limited number of embodiments, it will be appreciated that many variations, modifications and other applications of the invention may be made.

What is claimed is:

1. A codeword decoder for decoding one of a plurality of codewords, each codeword including a class code and a symbol code selected from the group consisting of literals and index codes, the codeword decoder comprising:
   (a) a symbol memory for storing symbols corresponding to respective index codes;
   (b) a class code decoder for extracting, from the codeword, information for decoding the symbol code of the codeword, said information for decoding the symbol code of the codeword including:
      (i) an indication of whether the symbol code of the codeword is a literal, and
      (ii) if the symbol code of the codeword is an index code, information related to an address in said symbol memory of said respective symbol of said index code; and
   (c) a symbol code decoder for receiving the codeword and for decoding the symbol code of the codeword, based on said information for decoding the symbol code of the codeword.

2. The codeword decoder of claim 1, wherein said class code decoder includes a PLA for receiving the class code of the codeword and for computing, from the class code of the codeword, said information for decoding the symbol code of the codeword.

3. The codeword decoder of claim 1, wherein said information related to said address in said symbol memory includes a high-order portion of said address.

4. The codeword decoder of claim 3, wherein said information related to said address in said symbol memory includes information related to a low-order portion of said address, and wherein said symbol code decoder includes a mechanism for computing said low-order portion of said address from said information related to said low-order portion of said address.

5. The codeword decoder of claim 4, wherein said information related to said low-order portion of said address includes a length of the codeword and a mask control word; and wherein said symbol code decoder includes:
   (i) a rotate left unit for aligning the codeword, based on said length of the codeword, thereby producing an aligned codeword; and
   (ii) a mask unit for masking said aligned codeword according to said mask control word to extract therefrom said low-order portion of said address.

6. The codeword decoder of claim 4, wherein said symbol code decoder includes a mechanism for combining said high-order portion of said address with said low-order portion of said address to recover said address.

7. A computer comprising:
   (a) a code memory for storing a plurality of blocks of compressed code, each said block including a first half-block and a second half-block, each said half-block including at least one codeword; and
   (b) two codeword decoders of claim 1, a first said codeword decoder for decoding said at least one codewords of said first half-blocks and a second said codeword decoder for decoding said at least one codewords of said second half-blocks.

8. The computer of claim 7, further comprising:
   (c) an address translation table including only references to beginning addresses of said blocks in said code memory, each said first half-block of each said block being addressed using said beginning address of said each block, each said second half-block of each said block being addressed using said beginning address of a block immediately subsequent to said each block.

9. A method of decoding one of a plurality of codewords, each codeword including a class code and a symbol code selected from the group consisting of literals and index codes, each index code corresponding to a respective symbol, the method comprising the steps of:
   (a) storing the symbols in a memory;
   (b) computing, from the class code of the codeword, information for decoding the symbol code of the codeword, said information including:
      (i) an indication of whether the symbol code of the codeword is a literal, and
      (ii) if the symbol code of the codeword is an index code, information related to an address in said memory of the respective symbol of the index code; and (c) if the symbol code of the codeword is an index code, reconstructing said address from said information related to said address.

10. The method of claim 9, wherein said information related to said address includes a high-order portion of said address, a length of the codeword and a mask control word, and wherein said reconstructing is effected by steps including:
   (i) aligning the codeword according to said length of the codeword, thereby producing an aligned codeword;
   (ii) masking said aligned codeword according to said mask control word to extract therefrom a low-order portion of said address; and
   (iii) combining said high order portion of said address with said low-order portion of said address.

11. A codeword decoder for decoding one of a plurality of codewords, each codeword including a plurality of class codes and a like plurality of symbol codes, each symbol code being selected from the group consisting of literals and index codes, the codeword decoder comprising:
   (a) a class code decoder for extracting, from said codeword, information for decoding the symbol codes of the codeword, said class code decoder including:
      (i) a PLA for receiving the class codes of the codeword and for computing, from the class codes of the codeword:
         (A) a class code combination number corresponding to the class codes of the codeword, and
         (B) for each symbol code of the codeword, a respective symbol class number; and
      (ii) for each symbol code of the codeword, a respective symbol class number translator for translating said respective symbol class number into said information for decoding said each symbol code of the codeword; and
   (b) a like plurality of symbol code decoders, each said symbol code decoder for receiving the codeword and for decoding a respective symbol code of the codeword, based on a respective portion of said information.

12. A method of encoding a plurality of symbols, comprising the steps of:
   (a) encoding each symbol separately as a respective class code and a respective symbol code;
   (b) concatenating said class codes and said symbol codes to provide a codeword that includes a first portion including only said concatenated class codes and a second portion including only said symbol codes, each said symbol code being selected from the group consisting of literals and index codes; and
   (c) decoding said codeword, by steps including:
      (i) for each symbol whose respective symbol code is an index code: storing said each symbol in a respective symbol memory at an address corresponding to said index code;
      (ii) extracting, from said first portion of said codeword, information for decoding said second portion of said codeword, said information including, for each said symbol code:
         (A) an indication of whether said each symbol code is a literal, and
         (B) if said each symbol code is an index code, information related to said address corresponding to said index code; and
      (iii) for each symbol whose respective symbol code is an index code: reconstructing said address corresponding to said index code from said information related to said address corresponding to said index code.

13. The method of claim 12, wherein said extracting is effected by steps including:
   (A) computing, from said first portion of said codeword, a class code combination number corresponding to said class codes;
   (B) translating said class code combination number into a total length of said class codes;
   (C) for each said symbol code, computing a respective symbol class number; and
   (D) translating said respective symbol class number into said information for decoding said second portion of said codeword.

14. The method of claim 13, wherein, for each said symbol whose respective symbol code is an index code, said information related to said address corresponding to said index code includes a high-order portion of said address and a length of said each symbol code, and wherein said reconstructing is effected by steps including:
   (A) aligning said codeword, based on said total length of said class codes and on said length of said each symbol code, thereby producing a respective aligned codeword;
   (B) masking said respective aligned codeword according to said length of said each symbol code to extract therefrom said low-order portion of said address; and
   (C) combining said high order portion of said address with said low order portion of said address.

15. A method of encoding a plurality of blocks, each block including 2N symbols, where N is a positive integer, comprising the steps of:
   (a) for each block:
      (i) compressing a first N symbols of said each block to provide N first codewords,
      (ii) compressing a second N symbols of said each block to provide N second codewords, said N second codewords being compressed oppositely to said compressing of said N first codewords, and
      (iii) concatenating said N first codewords with said N second codewords to provide a compressed block; and
   (b) storing said compressed blocks consecutively in a memory.

16. The method of claim 15, further comprising the step of:
   (c) providing an address translation table including only references to beginning addresses of said compressed blocks in said memory.

17. The method of claim 16, further comprising the step of:
   (d) for each said compressed block:
      (i) retrieving said each compressed block using only said references of said address translation table; and
      (ii) decoding said codewords of said each block.

18. The method of claim 17, wherein said first N codewords of said each block and said second N codewords of said each block are decoded substantially simultaneously.

19. A codeword decoder for decoding one of a plurality of codewords, each codeword including a plurality of class codes and a like plurality of symbol codes, each symbol code being selected from the group consisting of literals and index codes, the codeword decoder comprising:
   (a) a class code decoder for extracting, from said codeword, information for decoding the symbol codes of the codeword;

(b) a like plurality of symbol code decoders, each said symbol code decoder for receiving the codeword and for decoding a respective symbol code of the codeword, based on a respective portion of said information; and (c) a like plurality of symbol memories for storing symbols corresponding to respective index codes;

and wherein said information for decoding the symbol codes of the codeword includes, for each symbol code of the code word:

(i) an indication of whether said each symbol code is a literal, and (ii) if said each symbol code is an index code, information related to an address, in a respective said symbol memory, of said respective symbol of said index code.

20. The codeword decoder of claim 19, wherein, for each symbol code of the codeword, said information related to said address, in said respective said symbol memory, of said respective symbol of said index code, includes a high-order portion of said address.

21. The codeword decoder of claim 20, wherein, for each symbol code of the codeword, said information related to said address, in said respective said symbol memory, of said respective symbol of said index code, includes information related to a low-order portion of said address, and wherein said respective symbol code decoder includes a mechanism for computing said low-order portion of said address from said information related to said low-order portion of said address.

22. The codeword decoder of claim 21, wherein said class code decoder further includes:

(iii) a class code combination number translator for translating said class code combination number into a total length of the class codes of the codeword;

wherein, for each symbol code of the codeword, said information related to said low-order portion of said address includes a length of said each symbol code of the codeword, and wherein said respective symbol code decoder includes:

(i) a rotate left unit for aligning the codeword, based on said total length of the class codes of the codeword and on said length of said each symbol code of the codeword, thereby producing a respective aligned codeword; and (ii) a mask unit for masking said respective aligned codeword according to said length of said each symbol code of the codeword to extract therefrom said low-order portion of the address.

23. The codeword decoder of claim 22, wherein, for each symbol code of the codeword subsequent to a first symbol code of the codeword: said information related to said low-order portion of said address includes a length of each preceding symbol code of the codeword, and said aligning of the codeword in based on said lengths of said preceding symbol codes.

24. The codeword decoder of claim 21, wherein, for each symbol code of the codeword, said respective symbol code decoder includes a mechanism for combining said high-order portion of said address with said low-order portion of said address to recover said address.

25. A computer comprising:

(a) a code memory for storing a plurality of blocks of compressed code, each said block including a first half-block and a second half-block, each said half-block including at least one codeword; and (b) two codeword decoders of claim 20, a first said codeword decoder for decoding said at least one codeword of said first half-blocks and a second said codeword decoder for decoding said at least one codeword of said second half-blocks.

26. The computer of claim 25, further comprising:

(c) an address translation table including only references to beginning addresses of said blocks in said code memory, each said first half-block of each said block being addressed using said beginning address of said each block, each said second half-block of each said block being addressed using said beginning address of a block immediately subsequent to said each block.

* * * * *